United States Patent [19]

Snell et al.

[11] Patent Number: 5,566,961
[45] Date of Patent: Oct. 22, 1996

[54] MODULAR STORAGE UNIT

[75] Inventors: Rusty B. Snell; Walter Drysdale, both of Maryville, Tenn.

[73] Assignee: Rubbermaid Office Products Inc., Maryville, Tenn.

[21] Appl. No.: 273,335

[22] Filed: Jul. 11, 1994

[51] Int. Cl.⁶ ................................................. B62B 3/02
[52] U.S. Cl. ................... 280/47.35; 280/79.3; 220/4.31; 312/108; 312/350
[58] Field of Search .................. 280/30, 47.35, 280/79.3; 211/126, 188; 220/4.31, 4.32, 23.4, 23.86, 751; 312/108, 240, 265.5, 350

[56] References Cited

U.S. PATENT DOCUMENTS

| D. 245,744 | 9/1977 | Brooks | D6/186 |
|---|---|---|---|
| D. 275,044 | 8/1984 | Hampshire et al. | D34/21 |
| D. 302,064 | 7/1989 | Delmerico | D34/20 |
| D. 303,444 | 9/1989 | Yoshikawa | D34/21 |
| D. 322,875 | 12/1991 | Kelley | D34/21 |
| D. 323,915 | 2/1992 | Welch | D34/21 |
| D. 330,652 | 11/1992 | Goetz | D6/479 |
| D. 344,382 | 2/1994 | Conaway et al. | D34/21 |
| D. 347,131 | 5/1994 | Wolff | D6/479 |
| 1,963,594 | 6/1934 | Schwabe | 45/11 |
| 3,053,558 | 9/1962 | Challas, Jr. et al. | 287/119 |
| 3,109,420 | 11/1963 | Ott et al. | 220/4.31 X |
| 3,393,951 | 7/1968 | Sulentic | 312/350 X |
| 3,537,408 | 11/1970 | Bartlett | 108/156 |
| 3,575,440 | 4/1971 | Lay | 280/79.3 |
| 3,669,033 | 6/1972 | Murcia | 108/111 |
| 3,695,190 | 10/1972 | Bucholz | 108/91 |
| 3,827,573 | 8/1974 | Guerette | 211/149 |
| 3,851,936 | 12/1974 | Muller | 312/108 |
| 3,908,566 | 9/1975 | Frazelle et al. | 108/153 |
| 3,920,260 | 11/1975 | Downing | 280/79.3 |
| 4,053,192 | 10/1977 | Spetner | 312/265.5 X |
| 4,073,556 | 2/1978 | Wilson, Jr. | 312/250 |
| 4,099,203 | 7/1978 | Becker, III | 280/79.3 |
| 4,145,977 | 3/1979 | Yellin | 108/111 |
| 4,275,665 | 6/1981 | Silverman | 108/14 |
| 4,430,947 | 2/1984 | Kvame | 108/111 |
| 4,474,416 | 10/1984 | Rogahn | 312/257 |
| 4,512,591 | 4/1985 | Plante | 280/47.35 |
| 4,519,511 | 5/1985 | Mendenhall | 211/187 |
| 4,595,107 | 6/1986 | Welsch | 211/187 |
| 4,607,576 | 8/1986 | Kranjec | 108/110 |
| 4,615,278 | 10/1986 | Cabrelli | 108/111 |
| 4,644,876 | 2/1987 | Thomas | 108/111 |
| 4,691,644 | 9/1987 | Frydman | 108/111 |
| 4,763,799 | 8/1988 | Cohn et al. | 211/187 |

(List continued on next page.)

OTHER PUBLICATIONS

Dial Industries, Inc., 1538 Esperanza St., Los Angeles, CA 90023; 13-page brochure, date unknown.

Primary Examiner—Brian L. Johnson
Attorney, Agent, or Firm—Renner, Kenner, Greive, Bobak, Taylor & Weber

[57] ABSTRACT

A modular storage unit (10) includes a plurality of shelf components having a bottom portion (20) and at least one upstanding shelf end wall (40, 41). The components (20, 40, 41) are removably secured together by a plurality of flanges (30, 31, 81) and a plurality of flange receiving slots (42, 43, 72). The plurality of flanges (30, 31, 81) and the plurality of flange receiving slots (42, 43, 72) are individually and selectively formed in the shelf components (20, 40, 41) such that a selected one of the components having one of the flanges is removably secured to another selected component carrying one of the flange receiving slots by the flange being received within the flange receiving slots. Modular storage unit (10) can also include two spaced, parallel and opposing outer support end walls (12, 13), each end wall (12, 13) carrying a flange receiving slot (91) therein. A shelf component (11, 34) extends between the end walls (12, 13) and has a flange (90) on the side thereof, the flange being received within one of the flange receiving slots (91). Locking strips (100) having lip flanges (101, 102) thereon may be received in slots (110, 111) in the end walls (12, 13) and shelf assembly (11).

20 Claims, 9 Drawing Sheets

U.S. PATENT DOCUMENTS

| | | | |
|---|---|---|---|
| 4,786,122 | 11/1988 | Nichoalds | 312/257 |
| 4,807,802 | 2/1989 | Williams | 220/4.31 X |
| 4,824,137 | 4/1989 | Bolden | 280/652 |
| 4,869,518 | 9/1989 | Breveglierij et al. | 280/47.35 |
| 5,016,948 | 5/1991 | Welch | 312/250 |
| 5,069,466 | 12/1991 | Propst | 280/79.3 |
| 5,083,805 | 1/1992 | Monch et al. | 280/47.35 |
| 5,158,187 | 10/1992 | Taub | 211/186 |
| 5,368,380 | 11/1994 | Mottmiller et al. | 312/263 |

MODULAR STORAGE UNIT

TECHNICAL FIELD

The present invention is directed toward a unit for the storage, shelving and/or transportation of materials and goods. More particularly, the invention is directed toward a storage unit formed from a number of interconnected modular components. Specifically, the invention is directed toward a modular storage unit wherein the individual components making up the unit can be secured together by a number of flange and flange receiving slots selectively carried by the unit components.

BACKGROUND ART

Modular shelving units are known in the art. Often these units include a number of shelves or other components which can be attached to one or more end walls in a variety of configurations. Such units are normally held together by screws, nuts and bolts or similar hardware. While this might result in a unit having structural integrity, reconfiguration of the unit is very difficult. Further, repeated disassembly and reassembly will often weaken the hardware and the shelving unit itself.

There are a number of situations where it would be desirable to have a unit which can be quickly disassembled for storage or for reassembly in a different configuration. For example, a storage unit in the form of a mobile cart might be reconfigured to be adapted to a number of different uses. It would be difficult with known storage units to disassemble the unit by removing its hardware prior to reassembly with the shelves in a different location or the like.

A need exists, therefore, for a storage unit which can be quickly assembled, disassembled and reassembled in a variety of configurations with little or no hardware for the user to contend with. The unit should be adaptable to different storage requirements and yet should be secure enough when assembled so that it will not inadvertently become dismantled when in use.

DISCLOSURE OF THE INVENTION

It is therefore an object of the invention to provide a storage unit which can be assembled without the use of fastening hardware.

It is another object of the invention to provide a storage unit, as above, which can be quickly and easily assembled and disassembled.

It is a further object of the invention to provide a storage unit, as above, such that a variety of interchangeable parts can be added or reconfigured to meet a wide range of storage requirements.

It is also an object of the invention to provide a method of assembling a storage unit which does not require the use of any tools or fastening hardware.

These and other objects of the present invention, as well as the advantages over existing prior art forms, which shall become apparent from the description to follow, are accomplished by the invention as set forth and claimed herein.

In general, a modular storage unit has a plurality of shelf components including a bottom portion and at least one upstanding shelf end wall. The shelf components are removably secured together by a plurality of flange means and a plurality of flange receiving slot means. The plurality of flange means and the plurality of flange receiving slot means are individually and selectively formed on the shelf components, such that a selected one of the components having one of the flange means is removably secured to another selected component having one of the flange receiving slot means by the flange means being received within the flange receiving slot means.

There is also provided according to the invention a modular storage unit having an outer support wall assembly including two spaced, parallel and opposing end walls. Each end wall is formed with a flange receiving slot therein. A shelf component extends between the end walls. The shelf component has a first and a second flange means on opposing sides thereof, such that each of the flange means is individually received within one of the flange receiving slot means of the opposing end walls.

A preferred exemplary modular unit incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A storage unit embodying the concepts of the present invention is generally indicated by the numeral 10 on the attached drawings. As depicted in the drawings, storage unit 10 is configured as a mobile cart as will be more addressed hereinbelow. Storage unit 10 may also be configured as a free standing shelving unit or the like (not shown), as will be appreciated from the description to follow.

Figure 1:
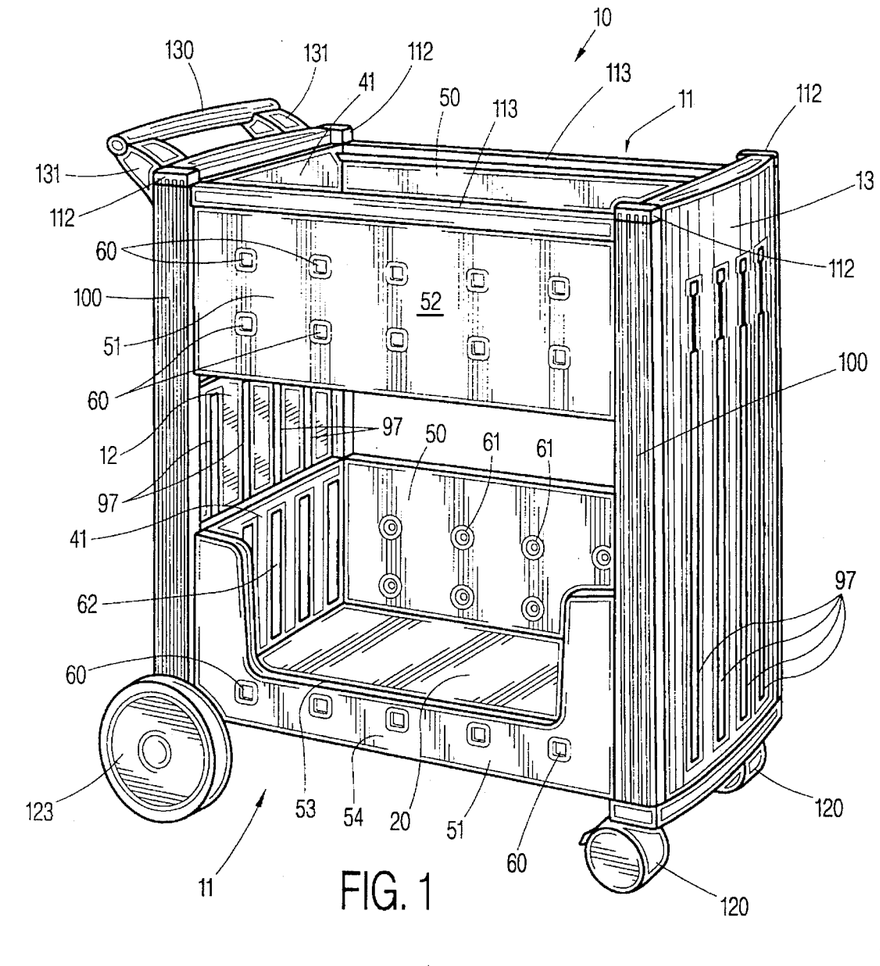
FIG. 1 is a perspective view of an assembled modular storage unit shown in the form of a mobile cart.

Storage unit 10 includes at one least shelf or bin assembly indicated generally by the numeral 11. In FIG. 1, unit 10 is shown as having two bin assemblies 11 of alternative designs, one of which is shown being assembled in FIG. 2. As will be more fully addressed below, each shelf assembly 1i has a number of components to meet a given use of storage unit 10. It is preferred that many of the individual components of each shelf assembly 11 be interchangeable to allow for user reconfiguration, in a manner that will,be described.

Each shelf assembly 11 may be used by itself as a storage unit. It is preferred, however, to employ first and second outer support wall assemblies 12 and 13 to which each shelf assembly 11 is removably affixed. As shown in FIG. 1, two shelf assemblies 11 are affixed at ends thereof to each of the first and second outer support assemblies 12 and 13 in a spaced and stacked configuration. In this configuration, both the upper and lower shelf assemblies 11, as depicted in the drawings, can serve as bins to hold materials to be transported. The nature of the materials to be transported is not germane to the invention, and will be limited only by the size, configuration and strength of the storage unit 10. It is preferred that each component of storage unit 10 be formed from a plastic material such as polyethylene or the like, by processes such as blow molding, injection molding, thermoforming, rotational molding, extruding or other conventional processes without limitation.

Figure 2:
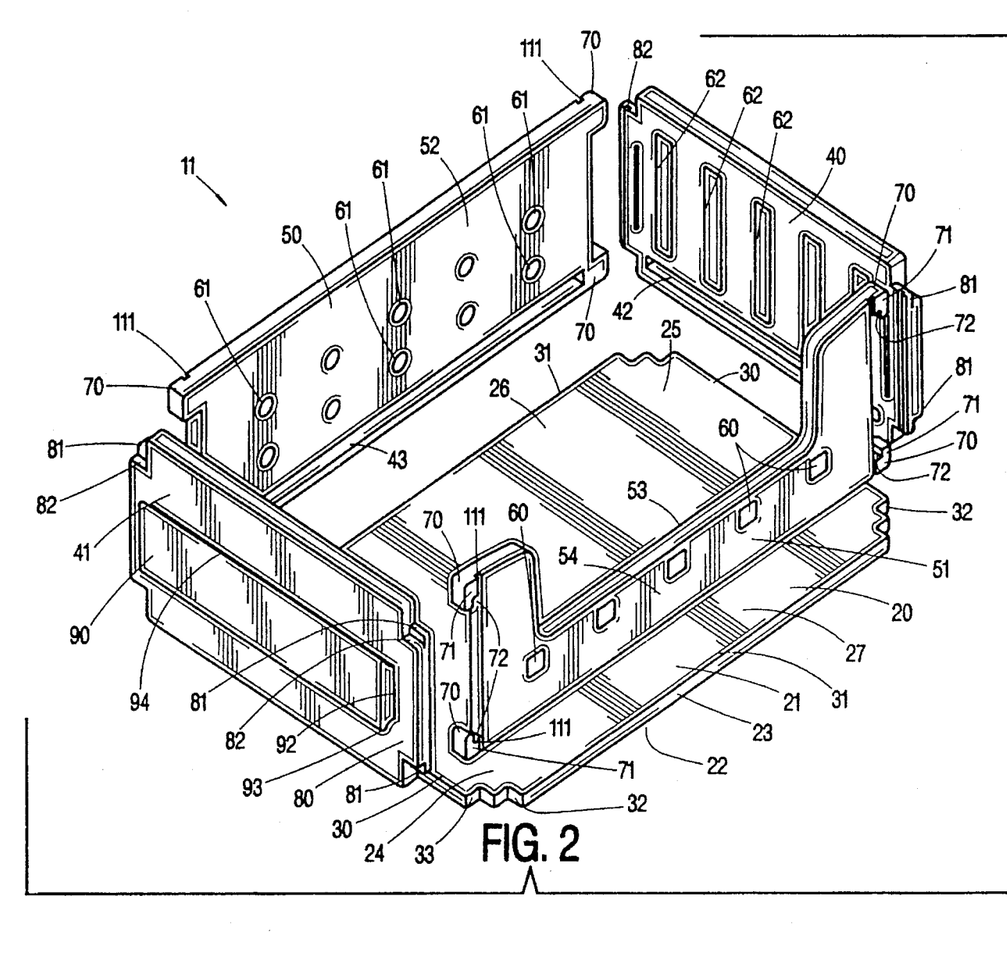
FIG. 2 is an exploded perspective view of one of the bins or shelves of the unit of FIG. 1 shown as it is being assembled.
Figure 8:
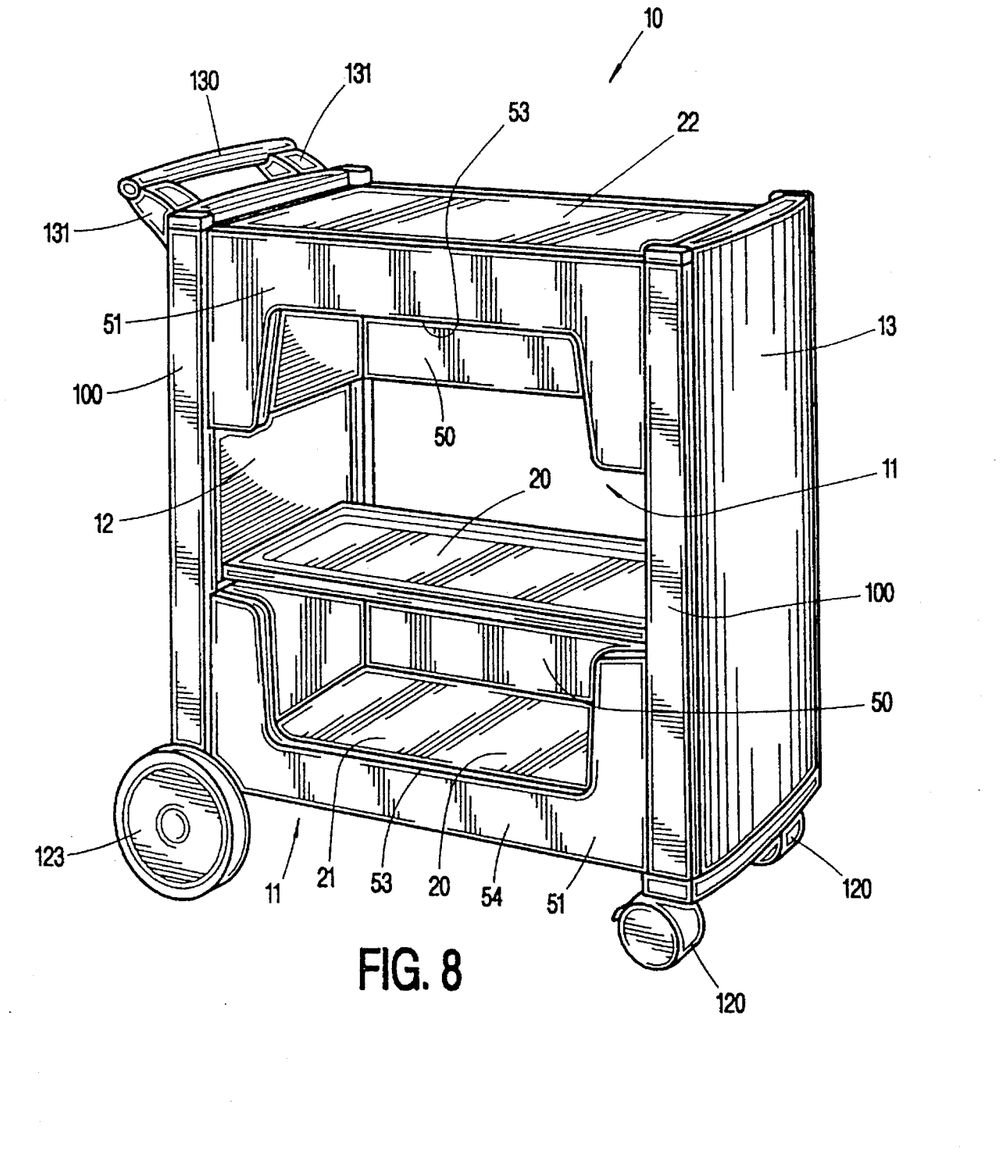
FIG. 8 is a perspective view of an assembled modular storage unit using the same general components of the units of FIGS. 1 and 7 but being in a different overall configuration.

With reference to FIG. 2, one shelf assembly 11 made in accordance with the present invention includes a base or bottom portion 20 having a generally planar top surface 21, a spaced parallel planar lower surface 22 and edges 23 defining the height of the space between upper and lower surfaces 21 and 22 (FIG. 8). While bottom portion 20 need not be of any particular shape, one preferred shape is rectangular such that bottom portion 20 has a length dimension extending between first and second ends 24 and 25 of bottom portion 20, and a width dimension extending between first and second sides 26 and 27 of bottom portion 20.

Bottom portion 20 is preferably configured to have separate coextensive flanges 30 extending from both first and second ends 24 and 25 in a manner substantially parallel to the planar top and bottom surfaces 21 and 22. It is further preferred that first and second sides 26 and 27 of bottom portion 20 also be configured with coextensive flanges 31. One example of a manner in which a coextensive flange 30 may be formed is by indenting a portion of bottom portion 20 to form a shoulder 32. Similarly, coextensive flanges 31 may be formed by indentations to form shoulder 33. Thus, coextensive flanges 30 extend from ends 24 and 25 of bottom portion 20 and have a length less than the width of bottom portion 20. Coextensive flanges 31 also have a length less that the length dimension of bottom portion 20. Flanges 30 and 31 of bottom portion 20 are sized so as to correspond to a flange receiving slot of other components of shelf assembly 11 which will now be described.

Figure 9:
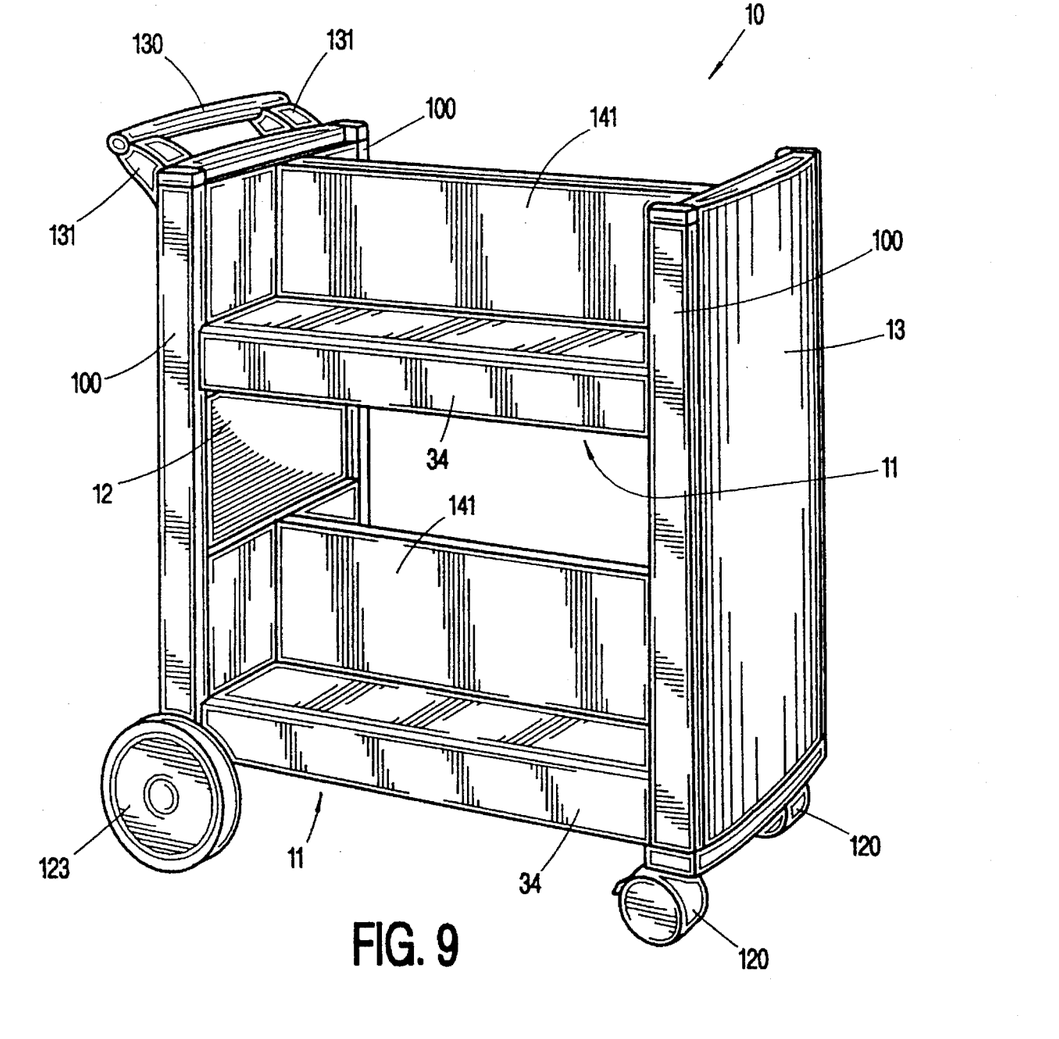
FIG. 9 is a perspective view of an assembled modular storage unit using the same general components of the units of FIGS. 1, 7 and 8 but being in a different overall configuration.

It will be appreciated that bottom portion 20 can be used by itself to form a useful storage unit 10 such as by providing a complementary flange receiving slot in first outer support assembly 12 and one in second outer support assembly 13. Although this is not depicted in the drawings, other shelving members similar to bottom portion 20 are shown. For example, FIG. 9 depicts a shelf member 34 affixed directly to first outer support assembly 12.

However, it is preferred that shelf assembly 11 include a first and a second shelf end upstanding walls 40 and 41 removably affixed to bottom portion 20. For convenience, the following discussion will make reference only to first shelf end wall 40, it being understood that the discussion has equal application to second end wall 41.

With continued reference to FIG. 2, it is also preferred that first end wall 40 be provided with a flange receiving groove or slot 42 selectively configured so as to be substantially complementary to coextensive flange 30. Thus, by receiving flange 30 of bottom portion 20 into flange receiving slot 42 of shelf end wall 40, shelf end wall 40 is affixed to bottom portion 20. To disassemble the affixation of shelf end wall 40 to bottom portion 20, it is necessary to merely remove coextensive flange 30 from flange receiving slot 42.

In the embodiment of shelf assembly 11 as shown in FIG. 2, first and second shelf side walls 50 and 51 are provided. Shelf side walls 50 and 51 can be affixed to bottom portion 20 in a manner substantially similar to that of shelf end walls 40 and 41. That is, each shelf side wall may be provided with a flange receiving slot 43 complementary in shape to coextensive flanges 30 and 31 so as to respectively receive those flanges.

In order to permit unit 10 to take on various configurations, components of shelf assembly 11 may be provided in differing shapes. For example, shelf side wall 50 as depicted in the drawings has a face portion 52 generally identical in size and shape along the length of shelf end wall 50. Shelf end wall 51 however, has a cutout portion 53 in its face 54. Cutout 53 may be desired for example, when a user is required to repeatedly remove items from shelf assembly 11 by providing increased access to the interior of that shelf assembly 11.

It will be appreciated that each shelf end wall 40 and 41 can be relocated on the opposite sides of bottom portion 20. The respective flange receiving slots 42 and 43 will still receive the respective flanges 30,31 in the manner described hereinabove. Thus, shelf assembly 11 and storage unit 10 is reconfigurable and modular in construction.

The components making up shelf assembly 11 may be provided with apertures 60, 61 and 62 to allow for viewing of the contents of shelf assembly 11, to add strength thereto and/or for aesthetic considerations.

While not necessary, it is preferred that when shelf side walls 50 and/or 51 and shelf end walls 40 and 41 are employed, each such component is attached to the other two components. That is, it is preferred that each shelf end wall 40 and 41 be separately and removably affixed to both shelf side walls 50 and 51. Similarly, shelf side walls 50 and 51 are each separately and removably affixed to shelf end walls 40 and 41.

One manner of affixing shelf end walls 40 and 41 to shelf side walls 50 and 51, is to provide another flange and flange receiving slot assembly selectively carried by one or the other shelf side walls 50 or 51 or end walls 40 or 41. In order to maintain the modular construction nature of storage unit 10, it is preferred that each end wall 40 and 41 carry either identical flanges or identical flange receiving slots, rather than one wall 40 or 41 carrying a flange and the other wall carrying a slot. Similarly, side walls 50 and 51 should each carry only identical flanges or slots. In the embodiment of storage unit 10 depicted in the drawings, end walls 40 and 41 carry flanges while side walls 50 and 51 carry slots, it being understood that this may be reversed and still fall within the scope of the invention. These flanges and slots will now be described.

Each shelf side wall 50 and 51 is provided, at each end thereof, with at least one and preferably two hook slots 70 protruding from side walls 50 and 51 in a manner generally parallel to the plane of respective face portions 52 and 54. The shank portions 71 of each hook slot 70 generally define a vertically extending slot 72. It is further preferred that each end of shelf end walls 50 and 51 have two hook slots 70 spaced apart and in a mirror configuration such that each respective slot 72 of a spaced pair of hook slots 70 are in an opposing relation.

Each end of shelf end walls 40 and 41 is preferably provided with an extending surface 80 having a flange 81 formed on each side of extending surface 80. Each flange 81 is receivable within a flange receiving slot 72 of a hook slot 70.

Figure 4:
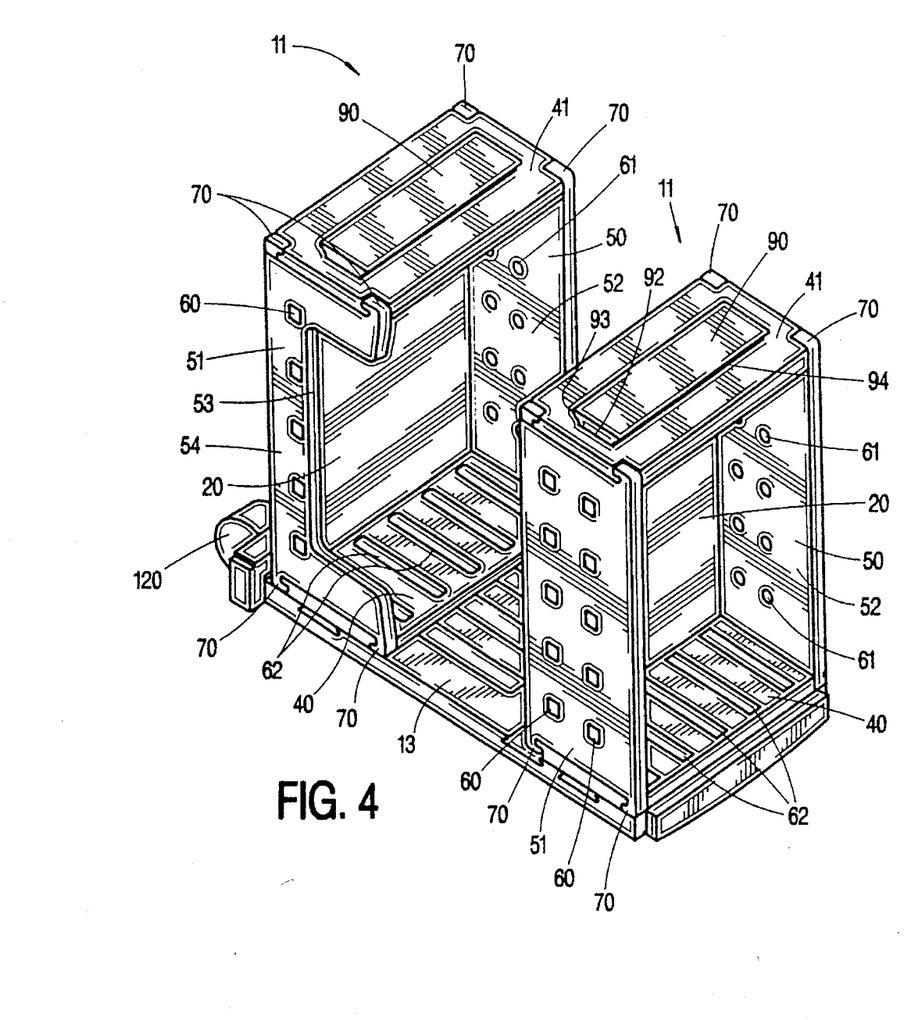
FIG. 4 is a perspective view showing further assembly of the unit of FIG. 1.

Flange 81 is configured to have a width less than that of extending surface 80, such that a shoulder 82 is formed therebetween. Each hook slot 70 is configured such that the terminal portion thereof is proximate to shoulder 82 when flange 81 is received within slot 72. As shown in FIG. 4, this provides for a generally uninterrupted, flush surface formed between affixed components of shelf assembly 11. Further, inadvertent disassembly of an affixed side wall 50,51 and an end wall 40,41 will be prevented by the terminal portion of shank 71 engaging, that is, physically making contact with flange 81.

As stated hereinabove, it is preferred to employ first and second outer support structures 12 and 13 to support one or more shelf assemblies 11 such as in a stacked configuration. The following discussion with respect to first outer support wall 12 will be understood to apply to second outer support wall 13 unless otherwise indicated.

In keeping with the construction of storage unit 10 as already described, first outer support assembly 12 is configured to be removably affixable to a shelf assembly 11 using a flange and flange receiving slot. Again, while the drawings and following description depict one component as carrying a flange and the other carrying a flange receiving slot, the configuration can be reversed as long as interchangeable modularity is maintained.

Figure 3:
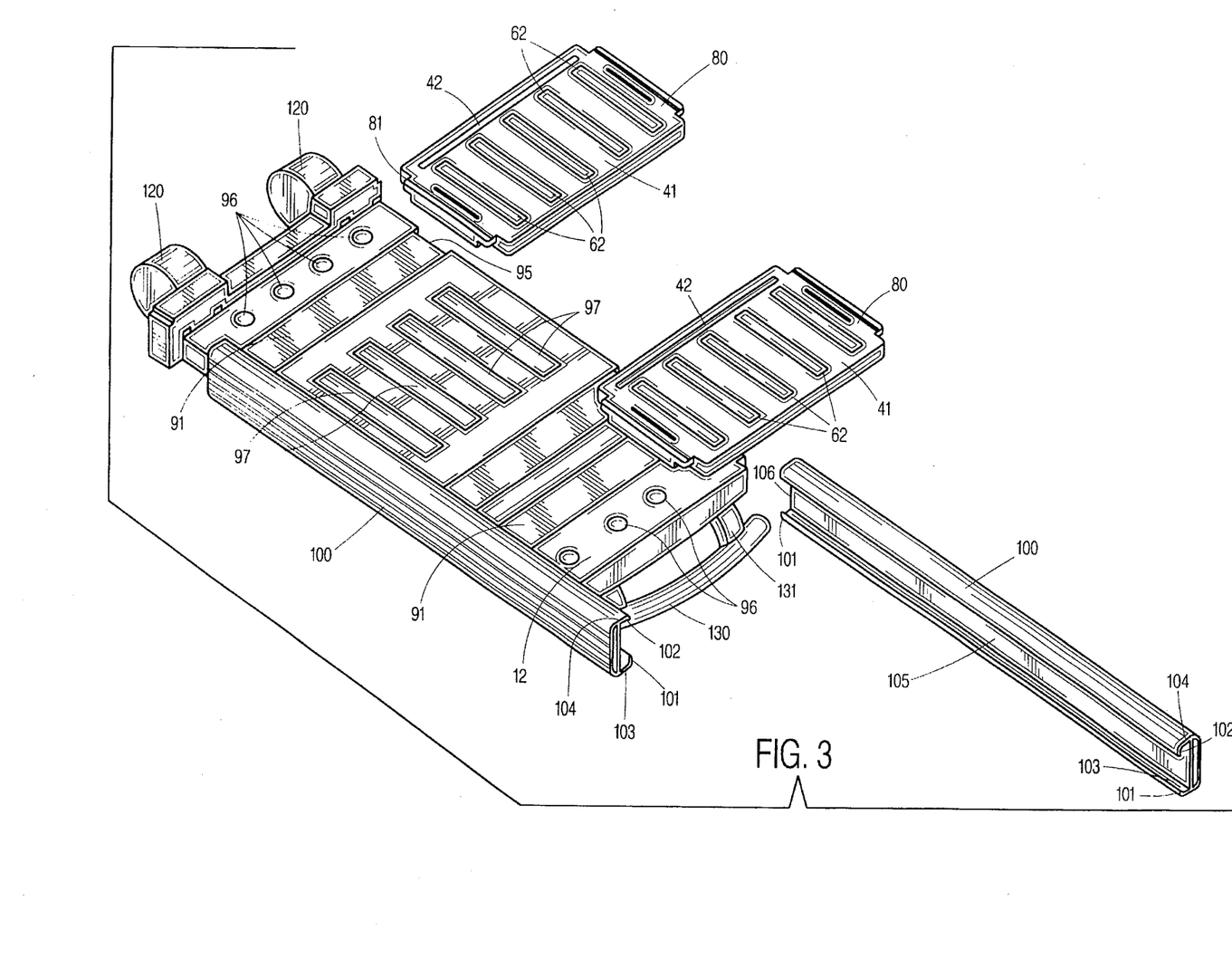
FIG. 3 is an exploded perspective view showing some of the steps employed to assemble the unit of FIG. 1.

Each shelf end wall 40 and 41 is provided with a flange 90 extending generally longitudinally with, and on the side opposite, slot 42. As shown in FIG. 3, first outer support assembly 12 is provided with a plurality of complementary open ended slots 91 which are configured to slidably receive a flange 90 into an open end thereof and then be slid into position. FIG. 3 depicts one end wall 40 spaced from first outer support assembly 12 and another end wall 40 partially slid into proper position thereon.

In a preferred embodiment, as shown in FIG. 2, flange 90 is in the shape of a dovetail, having a base portion 92 adjacent to end wall 41 and angularly extending tail portions 93 and 94. Open ended flange receiving slot 91 is configured in a complementary shape. Therefore, dovetail flange 90 is receivable within complementary dovetail slot 91 by sliding flange 90 through the open end 95 (FIG. 3) of slot 91. The other end of slot 91 may be closed or open. Because of the dovetail design, when shelf assembly 11 is thereby secured to first outer support assembly 12 as shown in FIG. 1, dovetail flange 90 cannot be removed from slot 91 until intentionally removed by sliding through open end 95 of slot 91.

Figure 5:
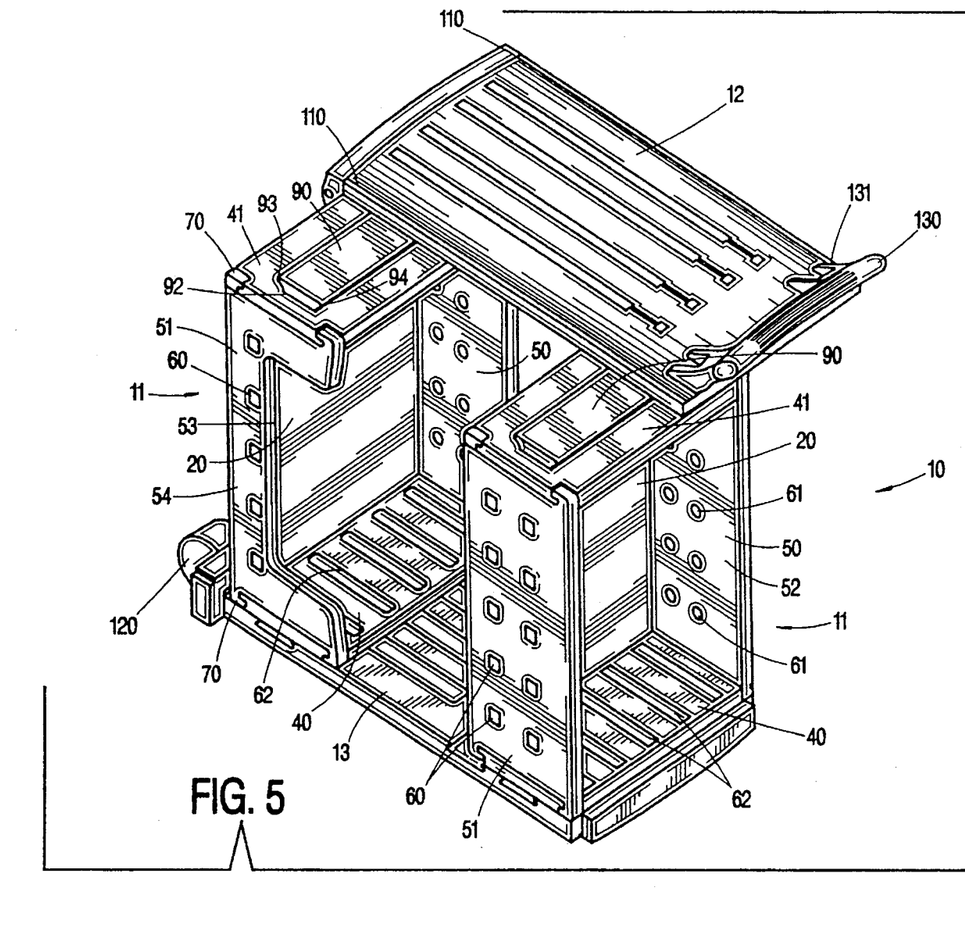
FIG. 5 is a perspective view showing further assembly of the unit of FIG. 1.

First outer support assembly 12 may be provided with any number of slots 91. In the drawings, first outer support assembly 12 is shown as having two slots 91 so as to be able to support two separate shelf assemblies 11 (FIG. 5). Thus, first outer support assembly 12 is an upstanding support wall for a given shelf assembly 11, and may include apertures 96 and 97 for strength, aesthetics and the like.

In order to more securely, yet removably, lock the various components of storage unit 10 as described above in their assembled positions, as shown in FIG. 1, a locking strip 100 (FIG. 3) may be employed. Locking strip 100 is maintained in a longitudinal position with respect to upstanding first outer support assembly 12 by interaction of yet another flange and flange receiving slot assembly. Locking strip 100 includes lip flanges 101 and 102 which are generally in a spaced parallel relation by virtue of being carried by opposing webs 103 and 104 respectively, extending from locking strip 100. A channel 105 is thus formed between opposing webs 103 and 104, with at least one end, such as end 106, being open. Lip flanges 101 and 102 extend from webs 103 and 104 respectively at a predetermined angle thereto.

Complementary to lip flange 101 is a lip flange receiving slot 110 in first outer support assembly 12 (FIG. 5). Further, shelf assembly 11 is provided with a complementary lip flange receiving slot 111 on a side of shelf assembly 11 at a right angle to the side of first outer support assembly 12 carrying lip flange receiving slot 110. As depicted, one embodiment shows a lip flange receiving slot 111 positioned proximate to the point of intersection between each hook slot 70 and its respective shelf side wall 50, 51. Lip flange slot 110 receives lip flange 102 while lip flange slot 111 receives lip flange 101. Because slots 110 and 111 are on surfaces at right angles to each other, locking strip 100 cannot be removed when so engaged except by sliding longitudinally therefrom through open end 106.

Figure 6:
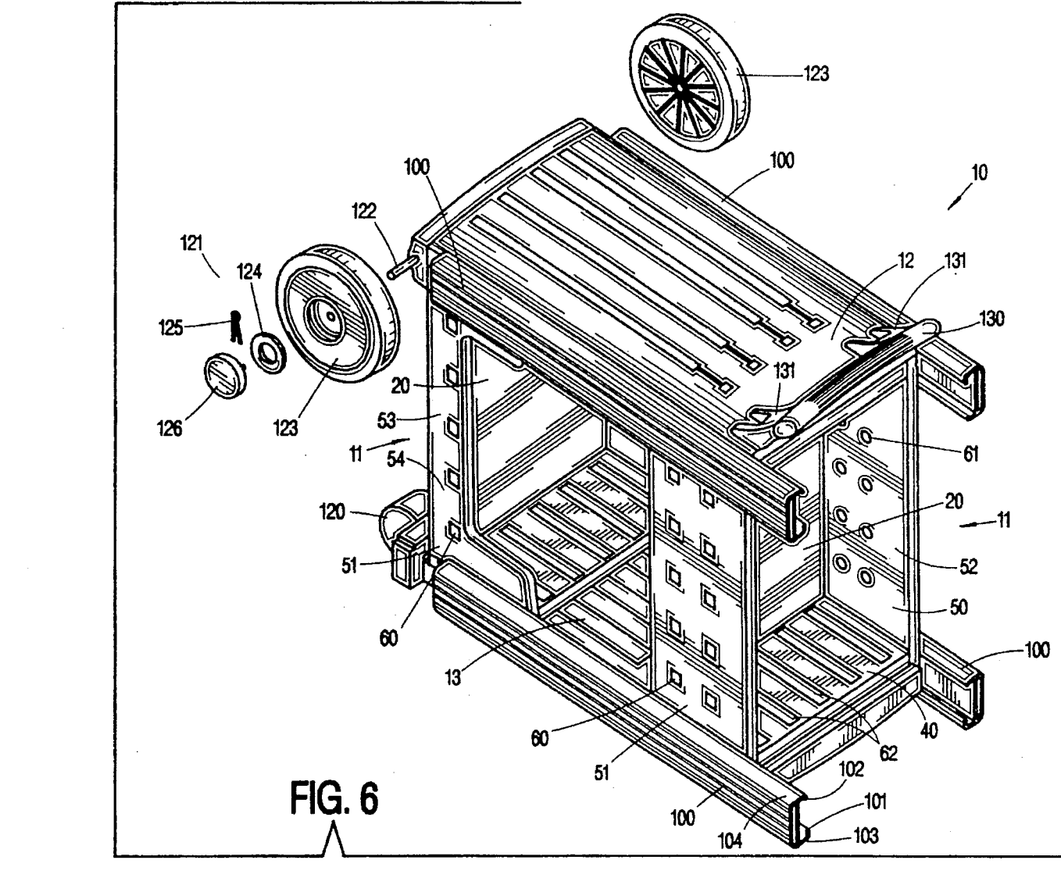
FIG. 6 is an exploded perspective view showing further assembly of the unit of FIG. 1.

As shown in FIG. 6, when shelf assembly 11 is assembled and affixed to first outer support assembly 12 with locking strips 100 in place, there are no exposed flange or flange receiving slots. Thus, storage unit 10 will be maintained in the assembled position until intentionally disassembled which can be accomplished by first removing locking strips 100 and then merely removing the other flanges from their respective flange receiving slots as discussed hereinabove. Further, caps 112 and rails 113 may be affixed to the exposed tops of locking strips 110 and side walls 50,51 in any manner, to further lock the components together and/or for aesthetic considerations.

One embodiment of the invention has attached wheels such that storage unit 10 may be used as a cart. As shown in FIGS. 1 and 3, conventional castors 120 may be affixed to a bottom side of first outer support assembly 12. Alternatively, conventional castors 120 may be affixed to second outer support assembly 13 and a larger conventional wheel assembly 121 (FIG. 6) affixed to first outer support assembly 12. Wheel assembly 121 includes an axle 122 substantially penetrating through first outer support assembly 12. A wheel 123 is positioned with axle 122 extending therethrough. A washer 124 is then placed onto axle 122 and the assembly held in place with a cotter pin 125 and the axle is capped with a cap 126.

In order to further aid in employing storage unit 10 as a cart, a handle 130 may be affixed to first outer support assembly 12 by handle support structures 131. A user would thus be able to grasp handle 130 to aid in pulling and/or pushing storage unit 10 in the configuration of a cart as shown in FIG. 1.

Figure 7:
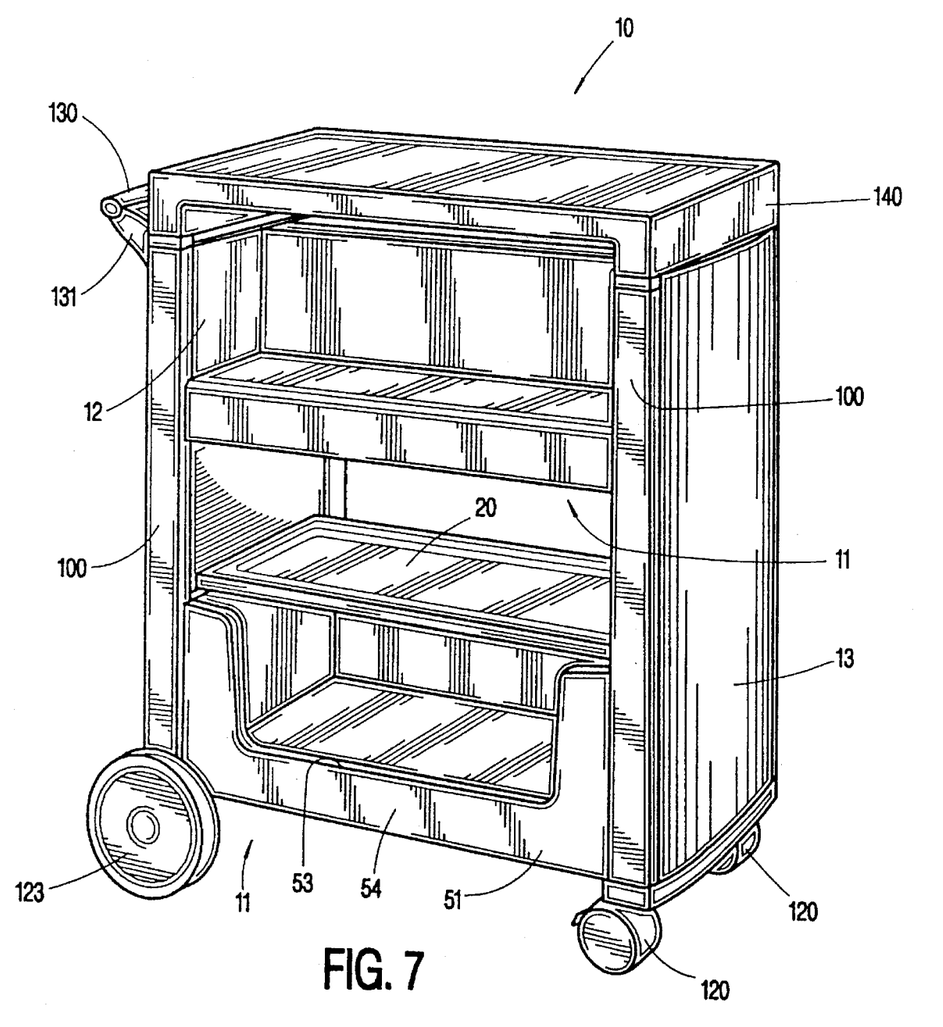
FIG. 7 is a perspective view of an assembled modular storage unit using the same general components of the unit of FIG. 1 but being in a different overall configuration.

FIGS. 7, 8 and 9 depict alternative embodiments of the present invention and also demonstrate the modular and interchangeable nature of the invention. FIG. 7 shows a storage unit 10 having a cap piece 140 affixed thereto. FIG. 9 shows a shelf assembly 11 without end walls 40,41 or side walls 50,51. Shelf assembly 11, as shown in FIG. 9, has an intermediate wall 141 and shelf portion 34 carries a dovetail flange (not shown) similar to dovetail flange 91. FIG. 8 shows two identical shelf assemblies 11 supported by first and second outer support assembles 12 and 13 in a mirrored and opposing manner so that the top assembly can be utilized as a simple shelf. This demonstrates the component interchangeability and the modular nature of the present invention.

In summary as to the manner in which storage unit 10 is assembled, the desired components for forming shelf assembly 11 are first selected. For example, the components depicted in FIG. 2 may be selected, which include two shelf end walls 40,41, two shelf side walls 50, 51 and a bottom portion 20. Coextensive end flanges 30 of bottom portion 20 are inserted into flange receiving slots 42 in each of shelf end walls 40,41 as described above. Similarly, coextensive side flanges 31 of bottom portion 20 are inserted into flange receiving slots 43 of shelf end walls 50,51 also as described hereinabove.

Each hook slot 70 on each shelf side wall 50, 51 receives a flange 81 on a shelf end wall 40, 41 as has been described. The assembled bin 11 may now be attached to outer supports 12 and 13, if desired by sliding dovetail flanges 90 into a dovetail slot 91 through open end 95 thereof, in both first outer support assembly 12 and second outer support assembly 13. If employed, lip flanges 101 and 102 of locking strip 100 are then received in lip flange receiving slots 111 and 110 respectively. Also if desired, wheels such as castors 120 and/or wheel assembly 121 may be attached. The assembled storage unit 10 may be disassembled by reversing the assembly procedure described hereinabove.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It is therefore evident that a device constructed and a method performed according to the concept of the present invention, and reasonably equivalent thereto, will accomplish the objects of the present invention and otherwise substantially improve the art of storage unit design and assembly.

We claim:

1. A modular storage unit comprising a plurality of shelf components including a bottom portion and at least one upstanding shelf end wall, each of said shelf components having an outer face; at least one of said shelf components being connected to an end wall of said modular storage unit said shelf components being removably secured together by a plurality of flange means and a plurality of flange receiving slot means; said plurality of flange means and said plurality of flange receiving slot means being individually and selectively carried on said shelf components such that a selected one of said components carrying one of said flange means is removably secured to another selected said component carrying one of said flange receiving slot means by said flange means being received within said flange receiving slot means; and each of said flange means not extending beyond said outer face of said shelf component such that when said flange means is received within said flange receiving slot means, said flange is selectively within or generally flush with said outer face.

2. A modular storage unit as in claim 1, wherein said plurality of shelf components further includes at least one upstanding shelf side wall and said bottom portion and each of said at least one shelf end wall and said at least one shelf side wall have a predetermined width, height and length dimensions, such that each said component has a first and a second opposing planar parallel surfaces spaced by said width dimension thereof.

3. A modular storage unit as in claim 2, wherein at least one of said shelf end walls and said shelf side walls is formed with a flange receiving slot substantially parallel to said length dimension.

4. A modular storage unit as in claim 3, wherein said bottom portion has a flange extending therefrom and substantially positioned within said planar surfaces thereof, such that said bottom portion flange is receivable within said flange receiving slot of said at least one of said shelf end walls and said shelf side walls.

5. A modular storage unit as in claim 2, wherein said at least one upstanding shelf end wall and said at least one upstanding shelf side wall are removably secured together at substantially a right angle therebetween by a slot receiving flange formed in said side wall having received therein a flange formed on said end wall.

6. A modular storage unit as in claim 5, wherein said slot receiving flange formed in said side wall is formed as the open area within a shank of a hook protruding from said side wall.

7. A modular storage unit as in claim 6, wherein said side wall having said flange receiving slot includes two of said hooks in a spaced and opposing relation, each of said two said hooks protruding from said side wall in a direction substantially parallel to said parallel planar surfaces of said side wall.

8. A modular storage unit as in claim 7, wherein said end wall which is secured to said side wall at a substantially right angle has an extension on at least one side thereof carrying said flange at a distal end thereof, such that said extension is receivable between said spaced opposing hooks and said flange on said distal end of said extension is receivable within said open area within said shanks of said hooks.

9. A modular storage unit as in claim 1, further comprising an outer support assembly secured to said at least one upstanding shelf end wall by a flange and a flange receiving slot means.

10. A modular storage unit as in claim 9, wherein said outer support assembly includes a wall having a flange receiving slot therein, wherein said flange receiving slot of said outer support assembly wall is positioned so as to receive a flange formed on said shelf end wall.

11. A modular storage unit as in claim 10, wherein said flange receiving slot of said outer support assembly wall is open ended on at least one end and wherein said flange of said shelf end wall received within said open ended flange receiving slot is in the shape of a dovetail, such that said dovetail flange is slidably received within a complementary shaped said open ended slot.

12. A modular storage unit as in claim 10, wherein said end wall of shelf assembly is removably locked in placed with said flange of said end wall received within said flange receiving slot of said outer support wall by a locking strip having a first and a second spaced and parallel longitudinal lips, said first longitudinal lip being received within a slot formed in said outer support wall and said second lip being received within a slot formed in said shelf assembly.

13. A modular storage unit as in claim 12, wherein said locking strip includes a longitudinal base portion, and a web extending from said base portion at a predetermined angle therefrom, said web carrying said first and second lips.

14. A modular storage unit as in claim 9 which includes two of said outer support assemblies each secured to a separate said end wall of said shelf assembly.

15. A modular storage unit as in claim 14, further comprising wheel means carried by at least one of said outer support walls such that the modular storage unit can be moved by rolling upon said wheel means.

16. A modular storage unit as in claim 15, further comprising handle means carried by at least one of said outer support walls such that said handle means can be grasped to aid in causing the modular storage unit to roll on said wheel means.

17. A modular storage unit comprising an outer support wall assembly including two spaced, parallel and opposing end walls, each said end wall formed with a flange receiving slot therein; each said end wall having at least one locking strip receiving slot therein; a shelf component extending between said end walls, said shelf component having a first and a second flange means on opposing sides thereof, such that each of said flange means is individually received within one of said flange receiving slot means of said opposing end walls; said shelf component having at least one locking strip receiving slot therein; and a locking strip slidably engaging one of said locking strip receiving slots carried by one of said end walls and a locking strip receiving slot carried by said shelf component such that said shelf component is removably secured to said end wall.

18. A modular storage unit as in claim 17, wherein said shelf component includes a bottom portion having first and second coextensive flange means.

19. A modular storage unit as in claim 17, wherein said shelf component includes a bottom portion and opposing upstanding wall portions positioned at opposing ends of said bottom portion, said upstanding wall portions each having a flange receiving slot means complementary to first and second coextensive flange means.

20. A modular storage unit as in claim 19, further comprising a third upstanding wall portion generally positioned at a right angle to said opposing upstanding wall portions positioned at opposing ends of said bottom portion and removably secured to at least one of said opposing wall portions by a flange means, and a flange receiving slot means selectively carried by said opposing upstanding wall portions and said third upstanding wall portion, such that said flange means is received within said slot means.

* * * * *